United States Patent
Miyauchi

(10) Patent No.: US 9,257,810 B2
(45) Date of Patent: Feb. 9, 2016

(54) OPTICAL DEVICE AND FIBER LASER DEVICE

(71) Applicant: FUJIKURA LTD., Tokyo (JP)

(72) Inventor: Hidenori Miyauchi, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 14/321,917

(22) Filed: Jul. 2, 2014

(65) Prior Publication Data

US 2015/0010277 A1    Jan. 8, 2015

(30) Foreign Application Priority Data

Jul. 5, 2013    (JP) ................... 2013-142154

(51) Int. Cl.
| | |
|---|---|
| *G02B 6/26* | (2006.01) |
| *G02B 6/42* | (2006.01) |
| *G02B 6/02* | (2006.01) |
| *H01S 3/30* | (2006.01) |
| *H01S 3/00* | (2006.01) |
| *H04B 10/25* | (2013.01) |
| *H01S 3/094* | (2006.01) |
| *G02B 6/255* | (2006.01) |
| *H01S 3/067* | (2006.01) |

(52) U.S. Cl.
CPC ..... *H01S 3/094003* (2013.01); *H01S 3/094007* (2013.01); *G02B 6/255* (2013.01); *H01S 3/06708* (2013.01); *H01S 3/06737* (2013.01)

(58) Field of Classification Search
CPC .................. H01S 3/094003; H01S 3/094007
USPC .................. 385/29, 126; 372/6; 359/341.3
See application file for complete search history.

(56) References Cited

U.S. PATENT DOCUMENTS

| | | | |
|---|---|---|---|
| 7,551,823 B2* | 6/2009 | Reith ............... | G02B 6/03627 385/123 |
| 2010/0188735 A1 | 7/2010 | Tamaoki | |
| 2013/0107898 A1* | 5/2013 | Lin ..................... | H01S 3/067 372/6 |

(Continued)

FOREIGN PATENT DOCUMENTS

| | | |
|---|---|---|
| JP | 2005-10242 A | 1/2005 |
| JP | 2005010242 A * | 1/2005 |

(Continued)

OTHER PUBLICATIONS

Japanese Office Action mailed Apr. 22, 2014 in corresponding application JP 2013-142154 with English translation (15 pages).

(Continued)

*Primary Examiner* — Robert Tavlykaev
(74) *Attorney, Agent, or Firm* — Westerman, Hattori, Daniels & Adrian, LLP

(57) ABSTRACT

An optical device includes a first medium which (i) has a refractive index lower than (a) a refractive index of an outermost shell part in a first outer shell removed area of a first optical fiber and (b) a refractive index of an outermost shell part in a second outer shell removed area of a second optical fiber and (ii) surrounds an entire side surface of the first outer shell removed area. Moreover, the optical device includes a second medium which (i) has a refractive index higher than a refractive index of an outermost shell part in the second outer shell removed area and (ii) surrounds at least a part of a side surface in the second outer shell removed area. The second outer shell removed area has a diameter larger than a diameter in the first outer shell removed area.

12 Claims, 6 Drawing Sheets

(56) References Cited

U.S. PATENT DOCUMENTS

2013/0302035 A1 11/2013 Suzuki
2015/0010277 A1 1/2015 Miyauchi

FOREIGN PATENT DOCUMENTS

| JP | 2007-271786 | A |   | 10/2007 |
| JP | 2007271786 | A | * | 10/2007 |
| JP | 2008-187100 | A |   | 8/2008 |
| JP | 2008-268747 | A |   | 11/2008 |
| JP | 2010-171322 | A |   | 8/2010 |
| JP | 5607793 | B1 |   | 10/2014 |
| WO | 2012/056573 | A1 |   | 5/2012 |
| WO | WO 2012/141847 | A1 | * | 10/2012 ............... G02B 6/26 |
| WO | 2013/145840 | A1 |   | 10/2013 |

OTHER PUBLICATIONS

Notice of Reasons for Refusal dated Jun. 23, 2015, issued in counterpart Japanese Patent Application No. 2014-174373 (2 pages).

Decision to Grant a Patent dated Sep. 15, 2015, issued in counterpart Japanese Patent Application No. 2014-174373, w/English translation (5 pages).

* cited by examiner

US 9,257,810 B2

OPTICAL DEVICE AND FIBER LASER DEVICE

This Nonprovisional application claims priority under 35 U.S.C. §119 on Patent Application No. 2013-142154 filed in Japan on Jul. 5, 2013, the entire contents of which are hereby incorporated by reference.

TECHNICAL FIELD

The present invention relates to (i) an optical device including two optical fibers which are fused to each other and (ii) a fiber laser device including the optical device.

BACKGROUND ART

In fields of laser processing, laser communication, and the like, a fiber laser device, a fiber amplifying device, and the like have been widely used. Such devices each generally include (i) an amplification fiber which is a double cladding fiber in which a core to which an active element (e.g., a rare earth ion such as ytterbium) is added and (ii) a transmission fiber which is a single cladding fiber (a single mode fiber) or a double cladding fiber.

Excitation light enters an inner cladding of the amplification fiber, via a combiner which is inserted into the amplification fiber. The excitation light is used to cause an active element, added to a core of the amplification fiber, to make a transition to a population inversion state. A fused point, where the amplification fiber and the transmission fiber are fused to each other, is usually covered with a high-refractive index resin. Residual excitation light, which remains without being absorbed by the active element, is absorbed by the high-refractive index resin.

Note, however, that residual excitation light having high energy enters a high-refractive index resin, in a case where a high-powered semiconductor laser is to be employed as an excitation light source so as to meet the demand for high power. Moreover, core light, which has high energy and is directed, at the fused point, from the core of the amplification fiber into the cladding of the transmission fiber, also enters the high-refractive index resin. In a case where the high-refractive index resin is a transparent resin, the high-refractive index resin transmits most of leakage light which has entered the high-refractive index resin. However, the leakage light which has entered the high-refractive index resin is partially absorbed by the high-refractive index resin, so that the high-refractive index resin generates heat. This accelerates a deterioration in high-refractive index resin, thereby causing a problem that reliability of the device is deteriorated.

Examples of a technique for addressing such a problem encompass an optical fiber protector disclosed in Patent Literature 1. Patent Literature 1 discloses an optical fiber protector for protecting a fusion-connecting part where double cladding fibers are fused to each other (or a fusion-connecting part of a double cladding fiber and a single cladding fiber). Such an optical fiber protector covers the fusion-connecting part with a transparent resin which is fixed to a part on a housing groove provided in a heat radiating plate.

CITATION LIST

Patent Literature

Patent Literature 1
  Japanese Patent Application Publication, Tokukai, No. 2007-271786 A (Publication Date: Oct. 18, 2007)

SUMMARY OF INVENTION

Technical Problem

Note that, even in a case where the technique disclosed in Patent Literature 1 is employed, it is imperative that leakage light, which has leaked, in the vicinity of a fused point, from a side surface of an optical fiber, enters a transparent resin. This will cause the leakage light to be partially absorbed by the transparent resin, so that the transparent resin generates heat. Particularly, leakage light having a high energy density enters a part of the transparent resin in the vicinity of the optical fiber. Therefore, even in a case where the technique disclosed in Patent Literature 1 is employed, it is imperative that a deterioration will occur in part of the transparent resin in the vicinity of the optical fiber. As the optical fiber in the vicinity of the fused point has a smaller diameter, the problem becomes more serious. This is because, as the optical fiber in the vicinity of the fused point has a smaller diameter, leakage light which enters the part of the transparent resin in the vicinity of the optical fiber has a higher energy density.

The present invention has been made in view of the problems, and an object of the present invention is to provide an optical device in which a deterioration in resin, covering a point where two optical fibers are fused to each other, is more difficult to occur than that in a conventional optical device.

Solution to Problem

An optical device of the present invention includes: a first optical fiber in which an outer shell part is removed in a first area inclusive an end surface thereof; a second optical fiber in which (i) an outer shell part is removed in a second area inclusive an end surface thereof and (ii) the end surface is fused to the end surface of the first optical fiber; a first medium which (a) has a refractive index lower than (I) a refractive index of an outermost shell part in the first area of the first optical fiber and (II) a refractive index of an outermost shell part in the second area of the second optical fiber and (b) surrounds a side surface in the entire first area of the first optical fiber; and a second medium which (A) has a refractive index higher than a refractive index of an outermost shell part in the second area of the second optical fiber and (B) surrounds a side surface in at least a part of the second area of the second optical fiber, the outermost shell part in the first area of the first optical fiber intersecting, in the end surfaces of the respective first and second optical fibers, with the outermost shell part in the second area of the second optical fiber, the second optical fiber having, at a boundary between the first medium and the second medium, a diameter larger than a diameter in the first area of the first optical fiber.

Advantageous Effects of Invention

According to the present invention, a deterioration which can be caused in first medium by leakage light is prevented. Moreover, a deterioration which can be caused in second medium by leakage light is suppressed.

DESCRIPTION OF EMBODIMENTS

The following description will discuss, with reference to the drawings, an optical device of an embodiment of the present invention.

[Schematic Configuration of Optical Device]

Figure 1:
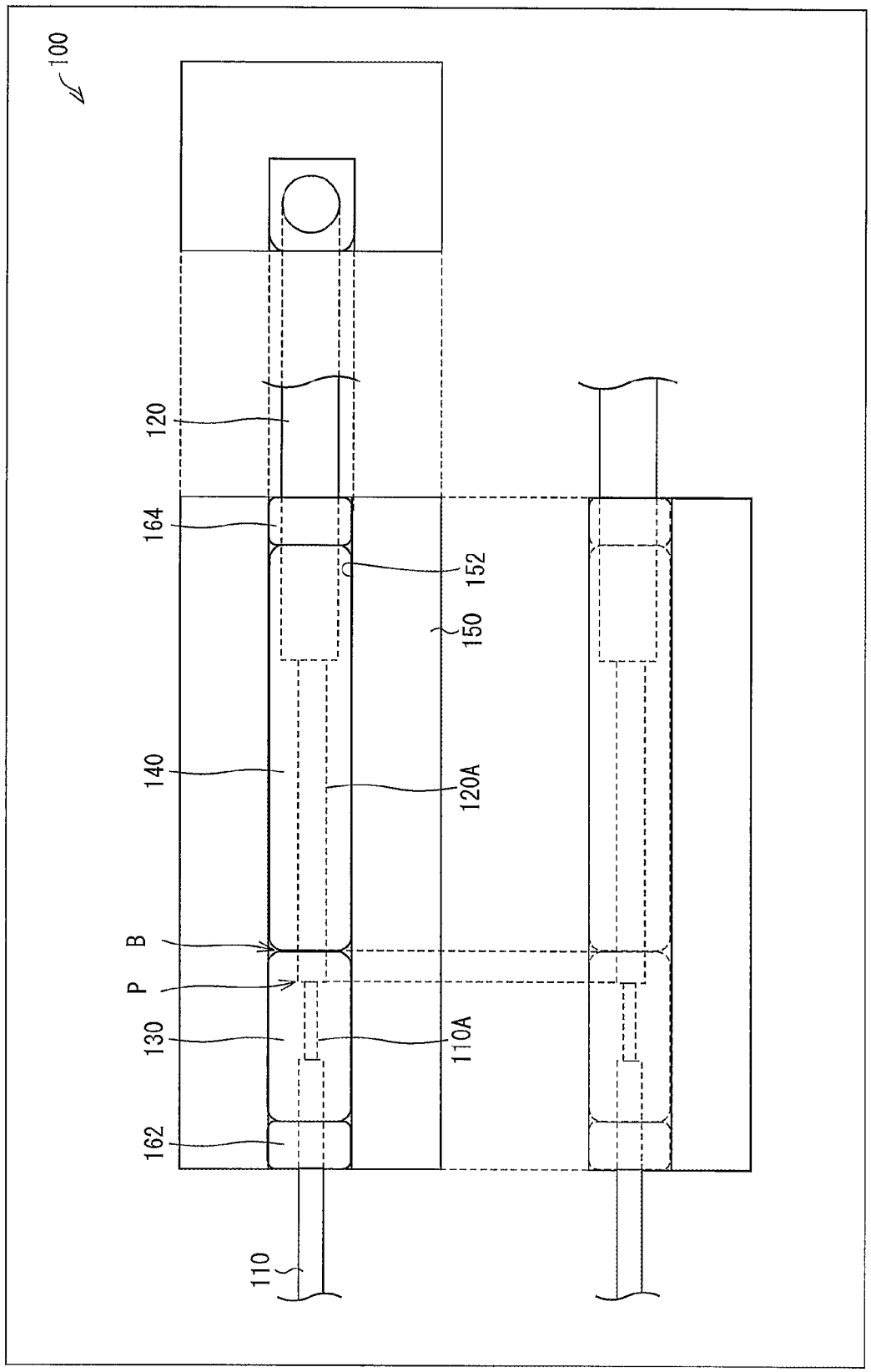
FIG. 1 is a view which includes a plan view, a side view, and an elevation view and illustrates an optical device of an embodiment of the present invention.

The following description will discuss a schematic configuration of an optical device 100 in accordance with the present embodiment with reference to FIG. 1. In FIG. 1, a configuration of the optical device 100 is illustrated by use of a plan view (upper left), a side view (lower left), and an elevation view (upper right).

The optical device 100 includes a first optical fiber 110, a second optical fiber 120, a first medium 130, a second medium 140, and a heat radiator 150 (see FIG. 1).

The first optical fiber 110 is an optical fiber in which an outer shell part such as cladding is removed in an area 110A inclusive an end surface. Note that the area 110A is hereinafter referred to as an outer shell removed area 110A. A configuration of the first optical fiber 110 will be specifically described later with reference to another drawing.

The second optical fiber 120 is an optical fiber in which an outer shell part such as cladding is removed in an area 120A inclusive an end surface. Note that the area 120A is hereinafter referred to as an outer shell removed area 120A. A configuration of the second optical fiber 120 will be specifically described later with reference to another drawing.

The end surface of the first optical fiber 110 (the end surface included in the outer shell removed area 110A) is fused to the end surface of the second optical fiber 120 (the end surface included in the outer shell removed area 120A) so that a center axis of the first optical fiber 110 is an extension of a center axis of the second optical fiber 120. A diameter (an outer diameter) in the outer shell removed area 120A of the second optical fiber 120 is larger than a diameter (an outer diameter) in the outer shell removed area 110A of the first optical fiber 110. An outermost shell part in the outer shell removed area 120A of the second optical fiber 120 intersects with (is in contact with and fused to), at a fused point P, an outermost shell part in the outer shell removed area 110A of the first optical fiber 110.

The heat radiator 150 is a member which (i) has a rectangular parallelepiped shape and (ii) is made of a material, such as metal, having a high heat-conducting property. As later described, the heat radiator 150 functions to convert, into heat, leakage light which has leaked out of a side surface of the second optical fiber 120. On an upper surface of the heat radiator 150, a groove 152 extending from one short side to the other short side of the upper surface is provided along a long side of the upper surface.

The first optical fiber 110 and the second optical fiber 120 (i) are provided in the groove 152 of the heat radiator 150 and (ii) are fixed to the heat radiator 150 with the use of an adhesive 162 and an adhesive 164 which are filled in respective both end parts of the groove 152. The adhesive 162 and the adhesive 164 are provided outside the outer shell removed area 110A and the outer shell removed area 120B. The outer shell removed area 110A and the outer shell removed area 120B are entirely provided between the adhesive 162 and the adhesive 164.

An intermediate part of the groove 152 provided on the heat radiator 150 (i.e., a part between the adhesive 162 and the adhesive 164) is filled with the first medium 130 and the second medium 140. That is, the first medium 130 and the second medium 140 surround the area, between the adhesive 162 and the adhesive 164, inclusive the fused point P where the first optical fiber 110 and the second optical fiber 120 are fused to each other.

The first medium 130 is a medium having a refractive index lower than (i) a refractive index of the outermost shell part in the outer shell removed area 110A of the first optical fiber 110 and (ii) a refractive index of the outermost shell part in the outer shell removed area 120A of the second optical fiber 120. The first medium 130 surrounds an entire side surface in the outer shell removed area 110A of the first optical fiber 110. The first medium 130 further surrounds a side surface of a part extending, to a part near the end part (an end part in the outer shell removed section 120A), from an end part, on which the fused point P is located, in the outer shell removed area 120A of the second optical fiber 120. Examples of the first medium 130 encompass a resin, air, and other mediums each made of material other than the resin and air.

The second medium 140 is a medium having a refractive index higher than that of the outermost shell part in the outer shell removed area 120A of the second optical fiber 120. The second medium 140 surrounds at least a part of a side surface in the outer shell removed area 120A of the second optical fiber 120. Examples of the second medium 140 encompass a resin and other mediums each made of material other than the resin.

Note that, according to the present embodiment, a boundary B between the first medium 130 and the second medium 140 is drawn closer to the second optical fiber 120 than a position of the fused point P where the first optical fiber 110 and the second optical fiber 120 are fused to each other. That is, as described above, the first medium 130 surrounds not only the entire side surface in the outer shell removed area 110A of the first optical fiber 110 but also the side surface of the end part in the outer shell removed area 120A of the second optical fiber 120. Note, however, that a position of the boundary B is not limited to this. For example, the boundary B between the first medium 130 and the second medium 140 can be drawn so that the fused point P is on the boundary B. In that case, the second medium 140 surrounds an entire side surface in the outer shell removed area 120A of the second optical fiber 120.

Even in the optical device 100, light, which has a low energy density and has leaked out of a side surface of the second optical fiber 120 having a large diameter, may enter the second medium 140. Note, however, that light, which has a high energy density and has leaked out of a side surface of the first optical fiber 110 having a small diameter, will almost never enter the first medium 130. This is because the side surface in the entire outer shell removed area 110A of the first optical fiber 110 is surrounded by the first medium 130 having the refractive index lower than that of the outermost shell part, whereas the side surface in at least a part of the outer shell removed area 120A of the second optical fiber 120 is surrounded by the first medium 130 having the refractive index higher than that of the outermost shell part. This brings about effects of (i) preventing a deterioration which can be caused in the first medium 130 by leakage light and (ii) suppressing a deterioration which can be caused in the second medium 140 by leakage light. Such effects can be brought about regardless of the configuration of the first optical fiber 110 or the configuration of the second optical fiber 120. That is, such effects can be brought about (i) regardless of whether the first optical fiber 110 is a single cladding fiber, a double cladding fiber, or a triple cladding fiber and (ii) regardless of whether the second optical fiber 120 is a single cladding fiber, a double cladding fiber, or a triple cladding fiber.

Note that, in the optical device 100, as described above, light may leak out of the part in the outer shell removed area 120A of the second optical fiber 120 which part is surrounded by the second medium 140. As such, in order for the optical device 100 to sufficiently eliminate unnecessary light (e.g., cladding light which propagates through a cladding of the first optical fiber 110), it is preferable that the part in the outer shell removed area 120A of the second optical fiber 120 which part is surrounded by the second medium 140 be sufficiently long in length. For this reason, according to the configuration illustrated in FIG. 1, (1) a length in the outer shell removed area 120A of the second optical fiber 120 which length is measured along a fiber axis is longer than a length in the outer shell removed area 110A of the first optical fiber 110 which length is measured along a fiber axis and (2) a length of the second medium 140 which length is measured along the fiber axis is longer than a length of the first medium 130 which length is measured along the fiber axis.

Specific Example 1

Figure 2:
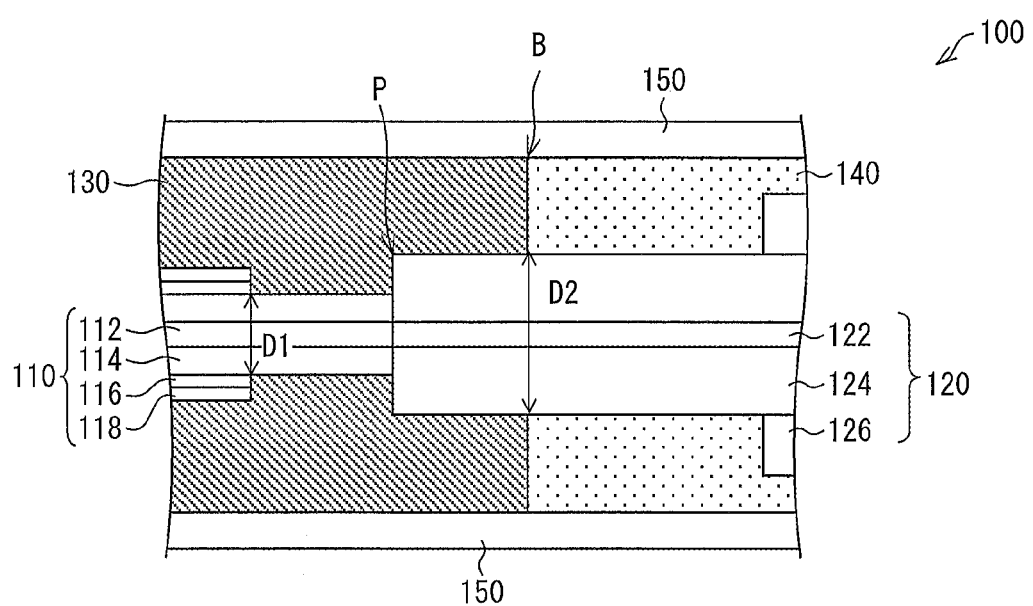
FIG. 2 is a cross sectional view illustrating (i) the optical device illustrated in FIG. 1 and (ii) Specific Example 1 of a configuration in the vicinity of a fused point.

A feature of the optical device 100 resides in a configuration in the vicinity of the fused point P. The following description will discuss Specific Example 1 of the configuration in the vicinity of the fused point P of the optical device 100 with reference to FIG. 2. FIG. 2 is a cross sectional view schematically illustrating a configuration in the vicinity of a fused point of an optical device 100 in accordance with Specific Example 1.

According to Specific Example 1, a double cladding fiber is employed as a first optical fiber 110. Specifically, the first optical fiber 110 is made up of a core 112, an inner cladding 114 surrounding the core 112, an outer cladding 116 surrounding the inner cladding 114, and a covering 118 surrounding the outer cladding 116.

For example, a silica glass or the like is employed as each material of the core 112 and the inner cladding 114. A resin or the like is employed as each material of the outer cladding 116 and the covering 118. In an outer shell removed area 110A (see FIG. 1), the outer cladding 116 and the covering 118 are removed so that the inner cladding 114 serves as an outermost shell part.

According to the first optical fiber 110, a refractive index of the inner cladding 114 is set lower than that of the core 112. This allows light to be confined in the core 112. Note that light propagating through the first optical fiber 110 while being confined in the core 112, is hereinafter referred to as "core light". According to the first optical fiber 110, a refractive index of the outer cladding 116 is set lower than that of the inner cladding 114. This allows light to be confined in the inner cladding 114. Note that light propagating through the first optical fiber 110 while being confined in the inner cladding 114, is hereinafter referred to as "cladding light".

According to Specific Example 1, a single cladding fiber is employed as a second optical fiber 120. Specifically, the second optical fiber 120 is made up of a core 122, a cladding 124 surrounding the core 122, and a covering 126 surrounding the cladding 124. The core 122 of the second optical fiber 120 has a diameter identical to that of the core 112 of the first optical fiber 110. The cladding 124 of the second optical fiber 120 has a diameter (outer diameter) D2 larger than a diameter (outer diameter) D1 of the inner cladding 114 of the first optical fiber 110.

For example, a glass or the like is employed as each material of the core 122 and the cladding 124. A resin or the like is employed as a material of the covering 126. In an outer shell removed area 120A (see FIG. 1), the covering 126 is removed so that the cladding 124 serves as an outermost shell part.

According to the second optical fiber 120, a refractive index of the cladding 124 is set lower than that of the core 122. This allows light to be confined in the core 122. Note that light propagating through the second optical fiber 120 while being confined in the core 122, is hereinafter referred to as "core light".

In the outer shell removed area 110A of the first optical fiber 110, an entire side surface is surrounded by a first medium 130. The first medium 130 is a medium having a refractive index lower than that of the inner cladding 114, which is the outermost shell part in the outer shell removed area 110A of the first optical fiber 110. As such, light will almost never leak out of the first optical fiber 110 toward the first medium 130.

Particularly, according to Specific Example 1, the first medium 130 is configured to have a refractive index not more than that of the outer cladding 116 of the first optical fiber 110. As such, light, which is confined in the inner cladding 114 outside the outer shell removed area 110A due to an action of the outer cladding 116, is confined in the inner cladding 114 in the outer shell removed area 110A due to an action of the first medium 130. Accordingly, cladding light, which has propagated through the first optical fiber 110 and has exited from an end surface of the first optical fiber 110, enters the cladding 124 of the second optical fiber 120 without leaking out of a side surface of the first optical fiber 110 toward the first medium 130.

In the outer shell removed area 120A of the second optical fiber 120, a side surface of an end part is surrounded by the first medium 130, whereas a side surface of a part other than the end part is surrounded by the second medium 140. The first medium 130 is a medium which has a refractive index lower than that of the cladding 124 which is an outermost shell part in the outer shell removed area 120A of the second optical fiber 120. As such, light will almost never leak out of the second optical fiber 120 toward the first medium 130. In contrast, the second medium 140 is a medium which has a refractive index higher than that of the cladding 124 which is the outermost shell part in the outer shell removed area 120A of the second optical fiber 120. This causes light to leak out of the second optical fiber 120 toward the second medium 140.

Figure 3:
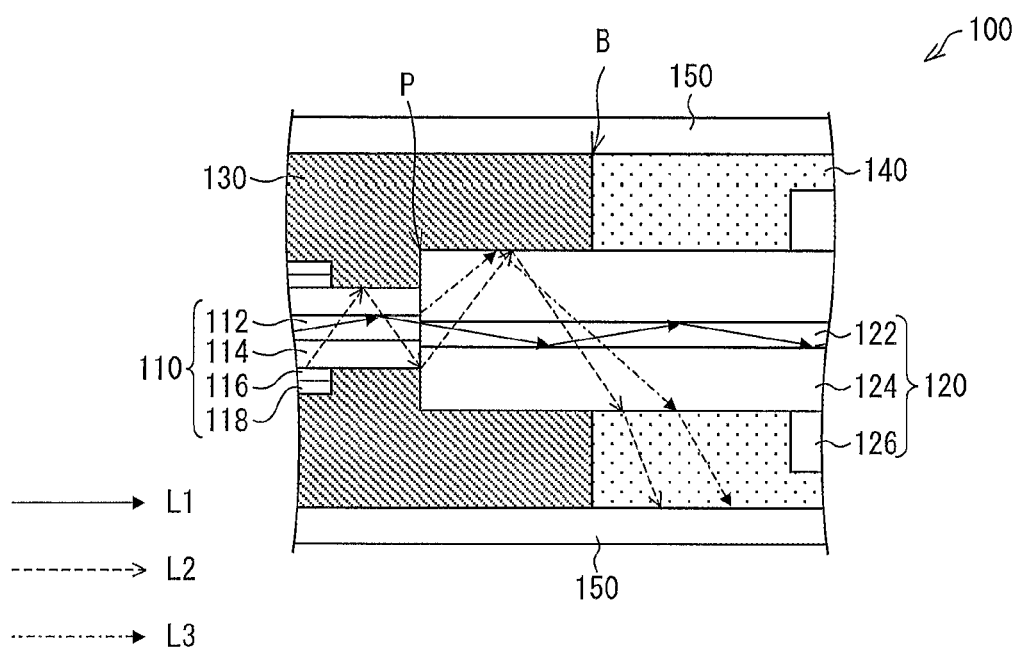
FIG. 3 is a cross sectional view illustrating the optical device illustrated in FIG. 1 and an effect of the configuration illustrated in FIG. 2.

The following description will discuss an effect brought about by the optical device 100 in accordance with Specific Example 1 with reference to FIG. 3. Note here that an attention is focused on core light L1 and cladding light L2 each of which propagates through the first optical fiber 110 toward the second optical fiber 120. Note also that examples of the cladding light L2 which propagates through the first optical fiber 110 encompass (i) residual excitation light (in a case where the second optical fiber 120 is an amplification fiber) and (ii) light which has entered the inner cladding 114 of the first optical fiber 110 in an end surface of the first optical fiber 110 which end surface is provided on a side opposite to a side of the fused point P.

The cladding light L2, which has propagated through the first optical fiber 110, enters the cladding 124 of the second optical fiber 120 without leaking out of the side surface of the first optical fiber 110. This is because the first medium 130 surrounds the entire side surface in the outer shell removed area 110A of the first optical fiber 110. In addition, this is also because the inner cladding 114 of the first optical fiber 110 is included, in the end surface on which the fused point P is located, in the cladding 124 of the second optical fiber 120. More specifically, an entire end surface of the inner cladding 114 of the first optical fiber 110 is in contact with and fused to, at the fused point P, an end surface of the cladding 124 of the second optical fiber 120, which entire end surface has a larger area than that of the end surface of the inner cladding 114.

The cladding light L2, which has entered the cladding 124 of the second optical fiber 120, propagates through the second optical fiber 120 without leaking toward the first medium 130, and then leaks out of a side surface of the second optical fiber 120 toward the second medium 140. This is because (i) the first medium 130 has a refractive index lower than that of the cladding 124 of the second optical fiber 120 and (ii) the second medium 140 has a refractive index higher than that of the cladding 124 of the second optical fiber 120.

The core light L1, which has propagated through the first optical fiber 110, partially enters the cladding 124 of the second optical fiber 120. This will occur mainly in a case where an axis of the first optical fiber 110 is not an extension of an axis of the second optical fiber 120. In this manner, light L3, which has entered the cladding 124 of the second optical fiber 120, also propagates through the second optical fiber 120 without leaking toward the first medium 130, and then leaks out of the side surface of the second optical fiber 120 toward the second medium 140.

As has been described, the core light L1 and the cladding light L2, each of which has propagated through the first optical fiber 110, leaks out of the side surface of the second optical fiber 120 toward the second medium 140, except for the core light L1 and the cladding light L2, each of which enters the core 122 of the second optical fiber 120. That is, light, which has a low energy density and has leaked out of the side surface of the second optical fiber 120 having a large diameter, may enter the second medium 140, but light, which has a high energy density and has leaked out of the side surface of the first optical fiber 110 having a small diameter, will never enter the first medium 130. This prevents a deterioration which can be caused in the first medium 130 by leakage light, and suppresses a deterioration which can be caused in the second medium 140 by leakage light.

Specific Example 2

Figure 4:
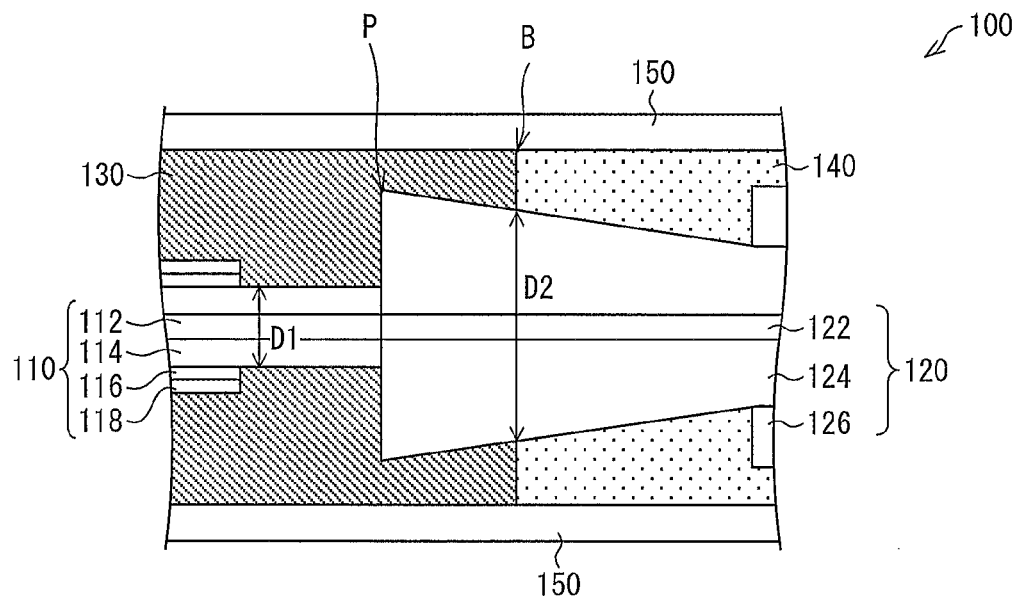
FIG. 4 is a cross sectional view illustrating (i) the optical device illustrated in FIG. 1 and (ii) Specific Example 2 of the configuration in the vicinity of the fused point.

The following description will discuss Specific Example 2 of the configuration in the vicinity of the fused point P of the optical device 100 with reference to FIG. 4. FIG. 4 is a cross sectional view schematically illustrating a configuration in the vicinity of a fused point P of an optical device 100 in accordance with Specific Example 2.

The optical device 100 of Specific Example 2 differs from the optical device 100 of Specific Example 1 in the following point. Specifically, according to Specific Example 1, the outer shell removed area 120A (see FIG. 1) of the second optical fiber 120 has a cylindrical shape in which a diameter is constant. According to Specific Example 2, on the other hand, an outer shell removed area 120A of a second optical fiber 120 has a tapered shape in which a diameter gradually becomes smaller as a distance from the fused point P becomes longer. In other respects, the optical device 100 of Specific Example 2 has a configuration similar to that of the optical device 100 of Specific Example 1.

Light, which has exited from a first optical fiber 110 and then has entered a cladding 124 of the second optical fiber 120, mostly propagates through the second optical fiber 120 without leaking toward a first medium 130, and then leaks out of a side surface of the second optical fiber 120 toward a second medium 140. In that case, as to energy of light which has leaked out of a side surface of each part of the second optical fiber 120, light, which has leaked out of a side surface of a part in the vicinity of a boundary B between the first medium 130 and the second medium 140, has largest energy. On the other hand, light which has leaked out of the side surface has smaller energy as a distance from the boundary B between the first medium 130 and the second medium 140 becomes longer. In other words, the light, which has exited from the first optical fiber 110 and then has entered the cladding 124 of the second optical fiber 120, intensively leaks in the vicinity of the boundary B (on a side of the second medium 140) between the first medium 130 and the second medium 140.

As illustrated in FIG. 4, in a case where a configuration is employed in which a diameter D2, at the boundary B between the first medium 130 and the second medium 140, of the second optical fiber 120 is larger than a diameter D1 in the outer shell removed area 110A (see FIG. 1) of the first optical fiber 110, it is possible to make sufficiently reduced an energy density of the light which has exited from the side surface of the second optical fiber 120 and then has entered the second medium 140. That is, it is possible to suppress a deterioration which can be caused in the second medium 140 by leakage light as with the optical device 100 of Specific Example 1. As illustrated in FIG. 4, in a case where a configuration is employed in which the second optical fiber 120 has a diameter which becomes smaller as a distance from the fused point P becomes longer, it is possible to uniformize an energy density of the light which has leaked out of a side surface of each part of the second optical fiber 120. This makes it possible to more effectively suppress a deterioration which can be caused in the second medium 140 by leakage light.

Note that, according to Specific Example 2, a minimum value of a diameter in the outer shell removed area 120A of the second optical fiber 120 is larger than the diameter D1 in the outer shell removed area 110A of the first optical fiber 110 (see FIG. 4). As such, even in a case where light propagates through the cladding 124 of the second optical fiber 120 toward the first optical fiber 110, no leakage light having a high energy density will enter the second medium 140.

Specific Example 3

Figure 5:
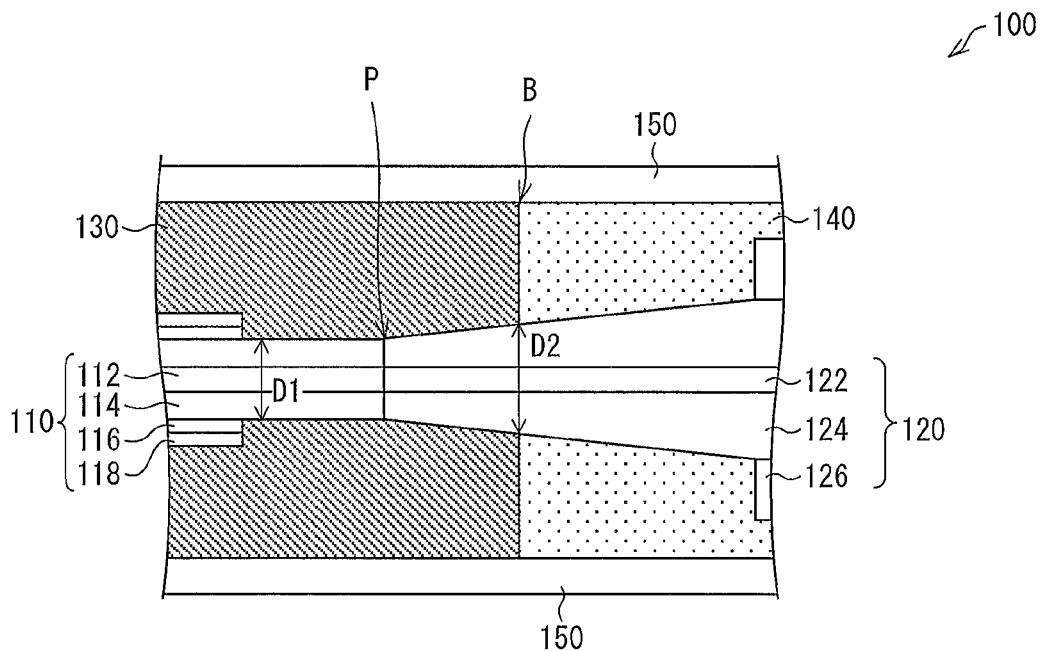
FIG. 5 is a cross sectional view illustrating (i) the optical device illustrated in FIG. 1 and (ii) Specific Example 3 of the configuration in the vicinity of the fused point.

The following description will discuss Specific Example 3 of the configuration in the vicinity of the fused point of the optical device 100 with reference to FIG. 5. FIG. 5 is a cross sectional view schematically illustrating a configuration in the vicinity of a fused point of an optical device 100 in accordance with Specific Example 3.

The optical device 100 of Specific Example 3 differs from the optical device 100 of Specific Example 1 in that an outer shell removed area 120A (see FIG. 1) of the second optical fiber 120 has a tapered shape in which a diameter gradually becomes larger as a distance from the fused point P becomes longer. In other respects, the optical device 100 of Specific Example 3 has a configuration similar to that of the optical device 100 of Specific Example 1.

Light, which has exited from a first optical fiber 110 and then has entered a cladding 124 of the second optical fiber 120, mostly propagates through the second optical fiber 120 without leaking toward a first medium 130, and then leaks out of a side surface of the second optical fiber 120 toward a second medium 140. In that case, as to energy of light which has leaked out of a side surface of each part of the second optical fiber 120, light, which has leaked out of a side surface of a part in the vicinity of a boundary B between the first medium 130 and the second medium 140, has largest energy. On the other hand, light which has leaked out of the side surface has smaller energy as a distance from the boundary B between the first medium 130 and the second medium 140 becomes longer. In other words, the light, which has exited from the first optical fiber 110 and then has entered the cladding 124 of the second optical fiber 120, intensively leaks in the vicinity of the boundary B (on a side of the second medium 140) between the first medium 130 and the second medium 140.

As illustrated in FIG. 5, in a case where a configuration is employed in which a diameter D2, at the boundary B between the first medium 130 and the second medium 140, of the second optical fiber 120 is larger than a diameter D1 in the outer shell removed area 110A (see FIG. 1) of the first optical fiber 110, it is possible to make sufficiently reduced an energy density of the light which has exited from the side surface of the second optical fiber 120 and then has entered the second medium 140. That is, it is possible to suppress a deterioration which can be caused in the second medium 140 by leakage light as with the optical device 100 of Specific Example 1.

Specific Example 3 employs a configuration in which the diameter in the outer shell removed area 110A of the first optical fiber 110 coincides with, at the fused point P, the diameter in the outer shell removed area 120A of the second optical fiber 120 (see FIG. 5). This brings about a secondary effect of making it easy for the first optical fiber 110 to be to fused to the second optical fiber 120.

Specific Example 4

Figure 6:
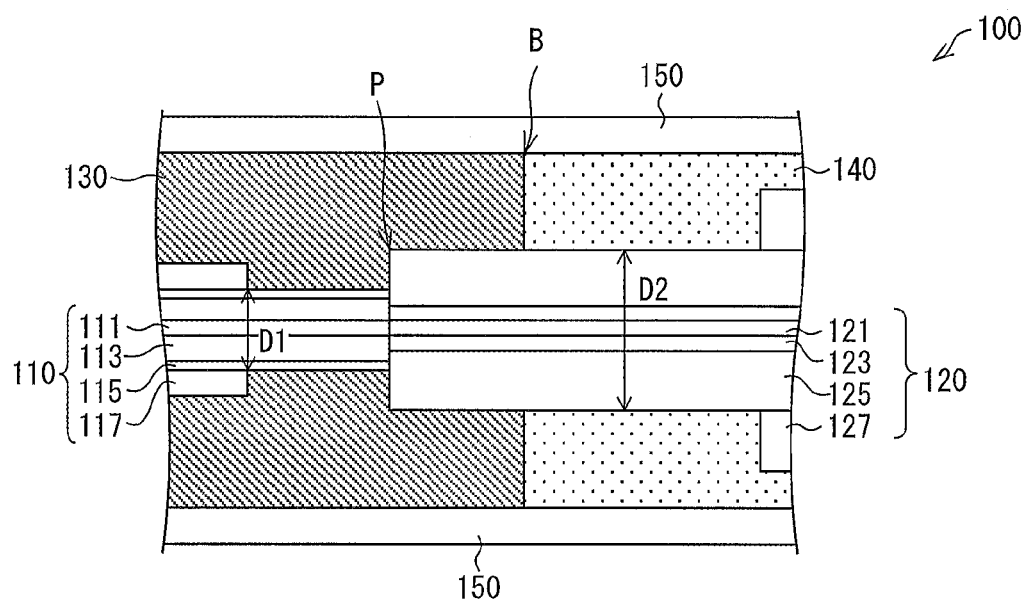
FIG. 6 is a cross sectional view illustrating (i) the optical device illustrated in FIG. 1 and (ii) Specific Example 4 of the configuration in the vicinity of the fused point.

The following description will discuss Specific Example 4 of the configuration in the vicinity of the fused point of the optical device 100 with reference to FIG. 6. FIG. 6 is a cross sectional view schematically illustrating a configuration in the vicinity of a fused point of an optical device 100 in accordance with Specific Example 4.

According to Specific Example 4, a triple cladding fiber is employed as a first optical fiber 110. Specifically, the first optical fiber 110 includes a core 111, a first cladding 113 surrounding the core 111, a second cladding 115 surrounding the first cladding 113, and a third cladding 117 surrounding the second cladding 115. In an outer shell removed area 110A (see FIG. 1), the third cladding 117 is removed so that the second cladding 115 serves as an outermost shell part.

According to Specific Example 4, a triple cladding fiber is employed as a second optical fiber 120. Specifically, the second optical fiber 120 includes a core 121, a first cladding 123 surrounding the core 121, a second cladding 125 surrounding the first cladding 123, and a third cladding 127 surrounding the second cladding 125. In an outer shell removed area 120A (see FIG. 1), the third cladding 127 is removed so that the second cladding 125 serves as an outermost shell part.

The second cladding 123 of the second optical fiber 120, the first cladding 113 of the first optical fiber 110, the second cladding 115 of the first optical fiber 110, and the second cladding 125 of the second optical fiber 120 have the following magnitude relation in terms of their outer diameters. As such, the second cladding 115 of the first optical fiber 110 intersects with (is in contact with and fused to), at the fused point P, only the second cladding 125 of the second optical fiber 120.

Outer diameter of the first cladding 123 of the second optical fiber 120.
    <Outer diameter of the first cladding 113 of the first optical fiber 110
    <Outer diameter of the second cladding 115 of the first optical fiber 110
    <Outer diameter of the second cladding 125 of the second optical fiber 120

In the outer shell removed area 110A of the first optical fiber 110, an entire side surface is surrounded by a first medium 130. The first medium 130 is a medium which has a refractive index lower than that of the second cladding 115 which is an outermost shell part in the outer shell removed area 110A of the first optical fiber 110. As such, light will almost never leak out of the first optical fiber 110 toward the first medium 130.

Particularly, according to Specific Example 4, the first medium 130 is configured to have a refractive index not more than that of the third cladding 117 of the first optical fiber 110. As such, light, which is confined in the second cladding 115 outside the outer shell removed area 110A due to an action of the third cladding 117, is confined in the second cladding 115 in the outer shell removed area 110A due to an action of the first medium 130. Accordingly, light, which has propagated through the second cladding 115 of the first optical fiber 110 and has exited from an end surface of the first optical fiber 110, enters the second cladding 125 of the second optical fiber 120 without leaking out of a side surface of the first optical fiber 110 toward the first medium 130.

In the outer shell removed area 120A of the second optical fiber 120, a side surface of an end part is surrounded by the first medium 130, whereas a side surface of a part other than the end part is surrounded by the second medium 140. The first medium 130 is a medium which has a refractive index lower than that of the second cladding 125 which is an outermost shell part in the outer shell removed area 120A of the second optical fiber 120. Accordingly, light will almost never leak out of the side surface of the second optical fiber 120 toward the first medium 130. On the other hand, the second medium 140 is a medium which has a refractive index higher than that of the second cladding 125 which is the outermost shell part in the outer shell removed area 120A of the second optical fiber 120. Accordingly, light leaks out of the side surface of the second optical fiber 120 toward the second medium 140.

According to the optical device 100 of Specific Example 4, light, which has propagated through the second cladding 115 of the first optical fiber 110, enters the second cladding 125 of the second optical fiber 120 and then leaks out of the side surface of the second optical fiber 120 toward the second medium 140. That is, light, which has a low energy density and has leaked out of the side surface of the second optical fiber 120 having a large diameter, may enter the second medium 140, but light which has a high energy density and has leaked out of the side surface of the first optical fiber 110 having a small diameter, will never enter the first medium 130. This prevents a deterioration which can be caused in the first medium 130 by leakage light, and suppresses a deterioration which can be caused in the second medium 140 by leakage light.

Specific Example 5

Figure 7:
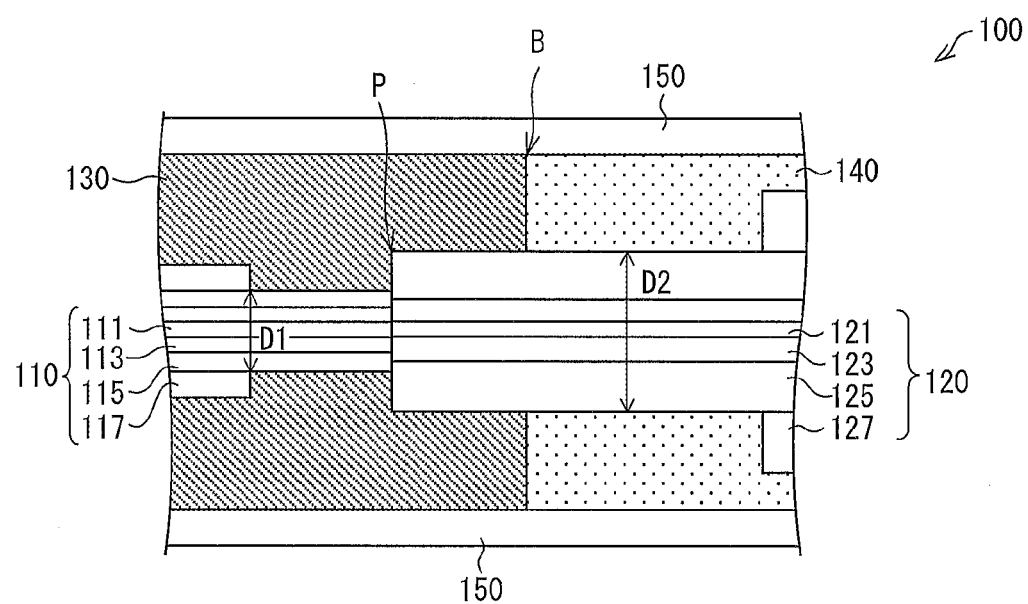
FIG. 7 is a cross sectional view illustrating (i) the optical device illustrated in FIG. 1 and (ii) Specific Example 5 of the configuration in the vicinity of the fused point.

The following description will discuss Specific Example 5 of the configuration in the vicinity of the fused point P of the optical device 100 with reference to FIG. 7. FIG. 7 is a cross sectional view schematically illustrating a configuration in the vicinity of a fused point P of an optical device 100 in accordance with Specific Example 5.

According to Specific Example 5, a triple cladding fiber is employed as a first optical fiber 110. Specifically, the first optical fiber 110 includes a core 111, a first cladding 113 surrounding the core 111, a second cladding 115 surrounding the first cladding 113, and a third cladding 117 surrounding the second cladding 115. In an outer shell removed area 110A (see FIG. 1), the third cladding 117 is removed so that the second cladding 115 serves as an outermost shell part.

According to Specific Example 5, a triple cladding fiber is employed as a second optical fiber 120. Specifically, the second optical fiber 120 includes a core 121, a first cladding 123 surrounding the core 121, a second cladding 125 surrounding the first cladding 123, and a third cladding 127 surrounding the second cladding 125. In an outer shell removed area 120A (see FIG. 1), the third cladding 127 is removed so that the second cladding 125 serves as an outermost shell part.

The first cladding 113 of the first optical fiber 110, the second cladding 123 of the second optical fiber 120, the second cladding 115 of the first optical fiber 110, and the second cladding 125 of the second optical fiber 120 have the following magnitude relation in terms of their outer diameters. As such, the second cladding 115 of the first optical fiber 110 intersects with (is in contact with and fused to), at the fused point P, both the second cladding 123 and the second cladding 125 of the second optical fiber 120.

Outer diameter of the first cladding 113 of the first optical fiber 110
 <Outer diameter of the first cladding 123 of the second optical fiber 120
 <Outer diameter of the second cladding 115 of the first optical fiber 110
 <Outer diameter of the second cladding 125 of the second optical fiber 120

In the outer shell removed area 110A of the first optical fiber 110, an entire side surface is surrounded by a first medium 130. The first medium 130 is a medium which has a refractive index lower than that of the second cladding 115 which is an outermost shell part in the outer shell removed area 110A of the first optical fiber 110. As such, light will almost never leak out of the first optical fiber 110 toward the first medium 130.

Particularly, according to Specific Example 5, the first medium 130 is configured to have a refractive index not more than that of the third cladding 117 of the first optical fiber 110. As such, light which is confined in the second cladding 115 outside the outer shell removed area 110A due to an action of the third cladding 117, is confined in the second cladding 115 in the outer shell removed area 110A due to an action of the first medium 130. Accordingly, light, which has propagated through the second cladding 115 of the first optical fiber 110 and has exited from an end surface of the first optical fiber 110, enters the first cladding 123 and the second cladding 125 of the second optical fiber 120 without leaking out of a side surface of the first optical fiber 110 toward the first medium 130.

In the outer shell removed area 120A of the second optical fiber 120, a side surface of an end part is surrounded by the first medium 130, whereas a side surface of a part other than the end part is surrounded by the second medium 140. The first medium 130 is a medium which has a refractive index lower than that of the second cladding 125 which is an outermost shell part in the outer shell removed area 120A of the second optical fiber 120. Accordingly, light will almost never leak out of the side surface of the second optical fiber 120 toward the first medium 130. On the other hand, the second medium 140 is a medium which has a refractive index higher than that of the second cladding 125 which is the outermost shell part in the outer shell removed area 120A of the second optical fiber 120. Accordingly, light leaks out of the side surface of the second optical fiber 120 toward the second medium 140.

According to the optical device 100 of Specific Example 5, light, which has propagated through the second cladding 115 of the first optical fiber 110, except for light entering the first cladding 123 of the second optical fiber 120, enters the second cladding 125 of the second optical fiber 120 and then leaks out of the side surface of the second optical fiber 120 toward the second medium 140. That is, light, which has a low energy density and has leaked out of the side surface of the second optical fiber 120 having a large diameter, may enter the second medium 140, but light which has a high energy density and has leaked out of the side surface of the first optical fiber 110 having a small diameter, will never enter the first medium 130. This prevents a deterioration which can be caused in the first medium 130 by leakage light, and suppresses a deterioration which can be caused in the second medium 140 by leakage light.

Application Example 1

Figure 8:
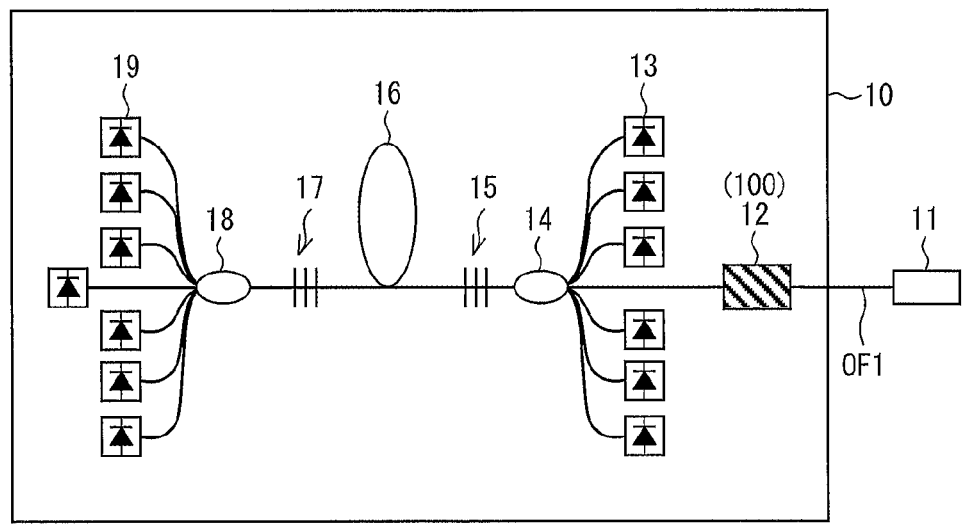
FIG. 8 is a view schematically illustrating a configuration of a fiber laser device which is Application Example 1 of the optical device illustrated in FIG. 1.

The following description will discuss Application Example 1 in which the optical device 100 is applied to a fiber laser device. FIG. 8 is a view schematically illustrating a configuration of a fiber laser device 10 of Application Example 1.

The fiber laser device 10 illustrated in FIG. 8 is a fiber laser device of bidirectional excitation resonator type. The fiber laser device 10 is a device for (i) amplifying laser light by excitation light which has been supplied from both directions of an amplification optical fiber 16 and (ii) supplying the laser light thus amplified to a light emitting section 11. According to the fiber laser device 10, an optical device 12, an excitation light source 13, an excitation light coupler 14, an FBG (Fiber Bragg Grating) 15, the amplification optical fiber 16, an FBG 17, an excitation light coupler 18, and an excitation light source 19 are provided in this order from an exit side of the laser light (see FIG. 8).

According to the fiber laser device 10, excitation light emitted from the excitation light source 19 enters a cladding of the amplification optical fiber 16 via the excitation light coupler 18 inserted into the amplification optical fiber 16. Excitation light emitted from the excitation light source 13 enters the cladding of the amplification optical fiber 16 via the excitation light coupler 14 inserted into the amplification optical fiber 16. The excitation light, which has entered the amplification optical fiber 16, propagates in both directions in the amplification optical fiber 16.

The amplification optical fiber 16 is a double cladding fiber which corresponds to the first optical fiber 110 of the above embodiment. According to the amplification optical fiber 16, the excitation light, propagating in both directions through the amplification optical fiber 16, amplifies laser light propagating through a core of the amplification optical fiber 16. An optical fiber OF1, which corresponds to the second optical fiber 120 of the above embodiment, is fused and connected to an end part on an exit side of the amplification optical fiber 16. The end part on the exit side of the optical fiber OF1 is connected to the light emitting section 11. This causes the laser light, which has been amplified in the amplification optical fiber 16, to propagate through the light emitting section 11 via the optical fiber OF1.

The optical device 12, which corresponds to the optical device 100 of the above embodiment, is provided in the fusion-connecting part. With the configuration, it is possible to eliminate, by use of the optical device 12, (i) residual excitation light which propagates through an inner cladding of the amplification optical fiber 16 toward the light emitting section 11 and (ii) laser light which has entered, at the fused point in a resonator, the inner cladding of the amplification optical fiber 16.

Application Example 2

Figure 9:
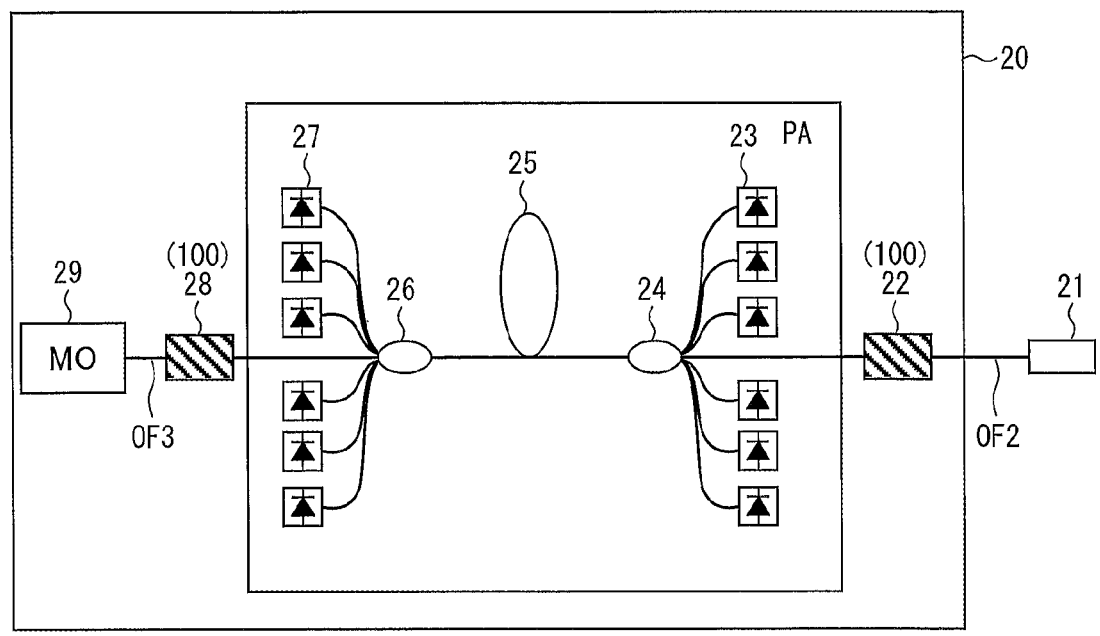
FIG. 9 is a view schematically illustrating a configuration of a fiber laser device which is Application Example 2 of the optical device illustrated in FIG. 1.

The following description will discuss Application Example 2 in which the optical device 100 is applied to another fiber laser device. FIG. 9 is a view schematically illustrating a configuration of a fiber laser device 20 of Application Example 2.

The fiber laser device 20 of Application Example 2 (see FIG. 9) is an MOPA-type fiber laser device for (i) amplifying, in a PA (Power Amplifier), laser light which has been emitted from an MO (Master Oscillator) 29 by use of excitation light which has entered from both directions of an amplification optical fiber 25 and (ii) supplying the laser light thus amplified to the light emitting section 21 which emits the laser light in accordance with a purpose for use. According to the fiber laser device 20 of Application Example 2, an optical device 22, an excitation light source 23, an excitation light coupler 24, the amplification optical fiber 25, an excitation light coupler 26, an excitation light source 27, an optical device 28, and the MO 29 are provided in this order from an exit side of the laser light (see FIG. 9).

According to the fiber laser device 20 having such a configuration, excitation light emitted from the excitation light source 27 enters the amplification optical fiber 25 via the excitation light coupler 26 inserted into the amplification optical fiber 25. Excitation light emitted from the excitation light source 23 enters the amplification optical fiber 25 via the excitation light coupler 24 inserted into the amplification optical fiber 25. An optical fiber OF3, which corresponds to the second optical fiber 120 of the above embodiment, is fused and connected to an end part, on an entering side, of a core of the amplification optical fiber 25. The end part on an entering side of the optical fiber OF3 is connected to the MO 29. As such, laser light emitted from the MO 29 enters the core of the amplification optical fiber 25 via the optical fiber OF3.

The amplification optical fiber 25 is a double cladding fiber which corresponds to the first optical fiber 110 of the above embodiment. According to the amplification optical fiber 25, the excitation light propagating through the amplification optical fiber 25 amplifies laser light propagating through the core of the amplification optical fiber 25. An optical fiber OF2, which corresponds to the second optical fiber 120 of the above embodiment, is fused and connected to an end part on an exit side of the amplification optical fiber 25. An end part on an exit side of the optical fiber OF2 is connected to the light emitting section 21. Accordingly, the laser light amplified in the amplification optical fiber 25 propagates through the light emitting section 21 via the optical fiber OF2.

The optical device 22, which corresponds to the optical device 100 of the above embodiment, is provided in the fusion-connecting part where the amplification optical fiber 25 and the optical fiber OF2 are fused to each other. With the configuration, it is possible to eliminate, by use of the optical device 22, residual excitation light which propagates through the amplification optical fiber 25 toward the light emitting section 21.

The excitation light propagating through the amplification optical fiber 25 can also enter the optical fiber OF3 which is fused and connected to the end part on the exit side of the amplification optical fiber 25. As such, the optical device 28, which corresponds to the optical device 100 of the above embodiment, is provided in the part where the amplification optical fiber 25 and the optical fiber OF3 are fused and connected to each other. As such, it is possible to eliminate, by use of the optical device 28, residual excitation light which propagates through the amplification optical fiber 25 toward the MO 29.

An optical device of the present invention includes: a first optical fiber in which an outer shell part is removed in a first area inclusive an end surface thereof; a second optical fiber in which (i) an outer shell part is removed in a second area inclusive an end surface thereof and (ii) the end surface is fused to the end surface of the first optical fiber; a first medium which (a) has a refractive index lower than (I) a refractive index of an outermost shell part in the first area of the first optical fiber and (II) a refractive index of an outermost shell part in the second area of the second optical fiber and (b) surrounds a side surface in the entire first area of the first optical fiber; and a second medium which (A) has a refractive index higher than a refractive index of an outermost shell part in the second area of the second optical fiber and (B) surrounds a side surface in at least a part of the second area of the second optical fiber, the outermost shell part in the first area of the first optical fiber intersecting, in the end surfaces of the respective first and second optical fibers, with the outermost shell part in the second area of the second optical fiber, the second optical fiber having, at a boundary between the first medium and the second medium, a diameter larger than a diameter in the first area of the first optical fiber.

The side surface in the entire outer shell removed area of the first optical fiber (the "first area" in the claims) is surrounded by the first medium having the refractive index lower than that of the outermost shell part in the outer shell removed area of the first optical fiber. The outermost shell part in the outer shell removed area of the first optical fiber intersects, in the end surfaces of the respective first and second optical fibers in each of which end surfaces the first optical fiber is fused to the second optical fiber, with the outermost shell part in the outer shell removed area of the second optical fiber (the "second section" in the claims). As such, light, which has propagated through the outermost shell part in the outer shell removed area of the first optical fiber (e.g., residual excitation light) and has existed from the end surface of the first optical fiber, enters the outermost shell part in the outer shell removed area of the second optical fiber without substantially leaking out of the side surface of the first optical fiber toward the first medium. The side surface in at least the part of the outer shell removed area of the second optical fiber is surrounded by the second medium having the refractive index higher than that of the outermost shell part in the outer shell removed area of the second optical fiber. As such, light, which (i) has propagated through the outermost shell part in the outer shell removed area of the first optical fiber, (ii) has exited from the end surface of the first optical fiber, (iii) has entered the outermost shell part in the outer shell removed area of the second optical fiber, and (iv) then has exited from the side surface of the second optical fiber, enters the second medium.

With the configuration, it is therefore possible to eliminate light propagating through the outermost shell part in the outer shell removed area of the first optical fiber (to cause the light to exit from the side surface of the second optical fiber and then enter the second medium) without substantially causing a deterioration in first medium by leakage light.

The leakage light, which (i) has exited from the end surface of the first optical fiber, (ii) has entered the outermost shell part in the outer shell removed area of the second optical fiber, (iii) has exited from the side surface of the second optical fiber, and (iv) has entered the second medium, has energy which (a) is largest at the boundary between the first medium and the second medium and (b) becomes smaller as a distance from the boundary is longer. With the configuration, the second optical fiber has, at the boundary, a diameter larger than that in the first area of the first optical fiber. This makes it possible to cause leakage light which has exited, in the vicinity of the boundary, from the side surface of the second optical fiber and has entered the second medium to have an energy density smaller than that of leakage light which has exited from the side surface of the first optical fiber and has entered the first medium (in a case where the first medium has a refractive index higher than that of the outermost shell part of the first optical fiber). This prevents a deterioration in second medium by leakage light.

The optical device of the present invention is preferably configured such that the first optical fiber is a double cladding fiber; the outermost shell part in the first area of the first optical fiber is an inner cladding of the double cladding fiber; and the outermost shell part in the second area of the second optical fiber intersects, in the end surfaces of the respective first and second optical fibers, with the inner cladding of the double cladding fiber.

With the configuration, light, which has propagated through the inner cladding of the first optical fiber and has exited from the end surface of the first optical fiber, enters the second optical fiber without substantially leaking out of the side surface of the first optical fiber toward the first medium. Light, which (i) has exited from the end surface of the first optical fiber, (ii) has entered the outermost shell part in the outer shell removed area of the second optical fiber, and (iii) has exited, in the vicinity of the boundary between the first medium and the second medium, from the side surface of the second optical fiber having a large diameter, enters the second medium. This prevents a deterioration which can be caused in first medium by leakage light, and suppresses a deterioration which can be caused in second medium by leakage light.

The optical device of the present invention is preferably configured such that the first medium has a refractive index not more than a refractive index of an outer cladding of the double cladding fiber.

With the configuration, light, which is confined in the inner cladding of the first optical fiber outside the outer shell removed area due to an action of the outer cladding, is confined in the inner cladding of the first optical fiber in the outer shell removed area due to an action of the first medium. As such, light, which has propagated through the inner cladding of the first optical fiber and has exited from the end surface of the first optical fiber, enters the second optical fiber without leaking out of the side surface of the first optical fiber toward the first medium. This more securely prevents a deterioration which can be caused in first medium by leakage light.

The optical device of the present invention is preferably configured such that the first optical fiber is a triple cladding fiber; the outermost shell part in the first area of the first optical fiber is a second cladding of the triple cladding fiber; the outermost shell part in the second area of the second optical fiber intersects, in the end surfaces of the respective first and second optical fibers, with (i) the second cladding of the triple cladding fiber or (ii) a first cladding and the second cladding of the triple cladding fiber.

With the configuration, light, which has propagated through the second cladding of the first optical fiber and has exited from the end surface of the first optical fiber or light, which has propagated through the first cladding and the second cladding of the first optical fiber and has exited from the end surface of the first optical fiber, enters the second optical fiber without substantially leaking out of the side surface of the first optical fiber toward the first medium. Light, which (i) has exited from the end surface of the first optical fiber, (ii) has entered the outermost shell part in the outer shell removed area of the second optical fiber, and (iii) has exited, in the vicinity of the boundary between the first medium and the second medium, from the side surface of the second optical fiber having a large diameter, enters the second medium. This prevents a deterioration which can be caused in first medium by leakage light, and suppresses a deterioration which can be caused in second medium by leakage light.

The optical device of the present invention is preferably configured such that the first medium has a refractive index not more than a refractive index of a third cladding of the triple cladding fiber.

With the configuration, light, which is confined in the second cladding of the first optical fiber outside the outer shell removed area due to an action of the third cladding is confined in the second cladding of the first optical fiber in the outer shell removed area due to an action of the first medium. As such, light, which has propagated through the second cladding of the first optical fiber and has exited from the end surface of the first optical fiber, enters the second optical fiber without leaking out of the side surface of the first optical fiber toward the first medium. This more securely prevents a deterioration which can be caused in first medium by leakage light.

The optical device of the present invention is preferably configured such that the second area of the second optical fiber is longer in length than the first area of the first optical fiber.

The optical device of the present invention is preferably configured such that a length of the second medium which length is measured along a center axis of the second optical fiber is longer than a length of the first medium which length is measured along a center axis of the first optical fiber.

With the configuration, it is possible to cause the part in the outer shell removed area of the second optical fiber which part is surrounded by the second medium to be sufficiently long in length without enlarging the optical device. This makes it possible to sufficiently eliminate unnecessary light such as residual excitation light.

The optical device of the present invention can be configured such that (i) the second area of the second optical fiber has a cylindrical shape in which a diameter is constant, (ii) the second area of the second optical fiber has a tapered shape in which a diameter becomes smaller as a distance from a point, where the second optical fiber and the first optical fiber are fused to each other, becomes longer, or (iii) the second area of the second optical fiber has a tapered shape in which a diameter becomes larger as a distance from a point, where the second optical fiber and the first optical fiber are fused to each other, becomes longer.

With any of the configurations, a deterioration which can be caused in first medium by leakage light is prevented and a deterioration which can be caused in second medium by leakage light is suppressed. Particularly, in a case where the second optical fiber has the tapered shape in which the diameter becomes smaller as the distance from the point, where the second optical fiber and the first optical fiber are fused to each other, becomes longer, it is possible to uniformize an energy density of the light which has leaked out of a side surface of each part of the second optical fiber. In a case where the second optical fiber has the tapered shape in which the diameter becomes larger as the distance from the point, where the second optical fiber and the first optical fiber are fused to each other, becomes longer, it is possible to making it easy to fuse the first optical fiber to the second optical fiber.

The optical device of the present invention is preferably configured to further include: a heat radiator in which a groove is provided, the first area of the first optical fiber and the second area of the second optical fiber being provided in the groove of the heat radiator, the first medium and the second medium each being a resin filling the groove.

With the configuration, it is possible to easily produce the optical device. Moreover, it is also possible to efficiently convert, into heat, by use of the heat radiator, leakage light which has leaked out of the side surface of the second optical fiber toward the second medium.

The present invention encompasses a fiber laser device including the optical device.

[Additional Descriptions]

The present invention is not limited to the description of the embodiments above, but may be altered by a skilled person in the art within the scope of the claims. An embodiment based on a proper combination of technical means disclosed in different embodiments is encompassed in the technical scope of the present invention.

INDUSTRIAL APPLICABILITY

The present invention is applicable to, for example, a light amplification device such as a fiber laser device or a fiber amplifying device.

REFERENCE SIGNS LIST

100: Optical device
110: First optical fiber
110A: Outer shell removed area (first area)
112: Core
114: Inner cladding (outermost shell part of first area)
116: Outer cladding (outer shell part)
118: Covering (outer shell part)
120: Second optical fiber
120A: Outer shell removed area (second area)
122: Core
124: Cladding (outermost shell part of second area)
126: Covering (outer shell part)
130: First medium
140: Second medium
150: Heat radiator
152: Groove
P: Fused point
B: Boundary (boundary between first optical fiber and second optical fiber)
10: Fiber laser device
20: Fiber laser device

The invention claimed is:

1. An optical device comprising:
a first optical fiber in which an outer shell part is removed in a first area inclusive of an end surface thereof;
a second optical fiber in which (i) an outer shell part is removed in a second area inclusive of an end surface thereof and (ii) the end surface of the second optical fiber is fused to the end surface of the first optical fiber;
a first medium which (a) has a refractive index lower than (I) a refractive index of an outermost shell part in the first area of the first optical fiber and (II) a refractive index of an outermost shell part in the second area of the second optical fiber and (b) surrounds a side surface in the entire first area of the first optical fiber; and
a second medium which (A) has a refractive index higher than a refractive index of the outermost shell part in the second area of the second optical fiber and (B) surrounds a side surface in at least a part of the second area of the second optical fiber,
the outermost shell part in the first area of the first optical fiber abutting, in the end surfaces of the respective first and second optical fibers, the outermost shell part in the second area of the second optical fiber,
the second optical fiber having, at a boundary between the first medium and the second medium, a diameter larger than a diameter in the first area of the first optical fiber; and the boundary between the first medium and the second medium being closer to the second optical fiber than a point where the first optical fiber and the second optical fiber are fused to each other,
the first medium covering said point and a part of the second optical fiber which part is close to said point.

2. The optical device as set forth in claim 1, wherein:
the first optical fiber is a double cladding fiber;
the outermost shell part in the first area of the first optical fiber is an inner cladding of the double cladding fiber; and
the outermost shell part in the second area of the second optical fiber abuts, in the end surfaces of the respective first and second optical fibers, the inner cladding of the double cladding fiber.

3. The optical device as set forth in claim 2, wherein the first medium has a refractive index not more than a refractive index of an outer cladding of the double cladding fiber.

4. The optical device as set forth in claim 1, wherein:
the first optical fiber is a triple cladding fiber;
the outermost shell part in the first area of the first optical fiber is a second cladding of the triple cladding fiber;
the outermost shell part in the second area of the second optical fiber abuts, in the end surfaces of the respective first and second optical fibers, (i) the second cladding of the triple cladding fiber or (ii) a first cladding and the second cladding of the triple cladding fiber.

5. The optical device as set forth in claim 4, wherein the first medium has a refractive index not more than a refractive index of a third cladding of the triple cladding fiber.

6. The optical device as set forth in claim 1, wherein the second area of the second optical fiber is longer in length than the first area of the first optical fiber.

7. The optical device as set forth in claim 1, wherein a length of the second medium which length is measured along a center axis of the second optical fiber is longer than a length of the first medium which length is measured along a center axis of the first optical fiber.

8. The optical device as set forth in claim 1, wherein the second area of the second optical fiber has a cylindrical shape in which a diameter is constant.

9. The optical device as set forth in claim 1, wherein the second area of the second optical fiber has a tapered shape in which a diameter becomes smaller as a distance from the point, where the second optical fiber and the first optical fiber are fused to each other, becomes longer.

10. The optical device as set forth in claim 1, wherein the second area of the second optical fiber has a tapered shape in which a diameter becomes larger as a distance from the point, where the second optical fiber and the first optical fiber are fused to each other, becomes longer.

11. An optical device as set forth in claim 1, further comprising:
  a heat radiator in which a groove is provided,
  the first area of the first optical fiber and the second area of the second optical fiber being provided in the groove of the heat radiator,
  the first medium and the second medium each being a resin filling the groove.

12. A fiber laser device comprising:
  the optical device as set forth in claim 1.

\* \* \* \* \*